US012382849B2

(12) United States Patent
Fanshier et al.

(10) Patent No.: US 12,382,849 B2
(45) Date of Patent: Aug. 12, 2025

(54) SYSTEMS COMPRISING AGRICULTURAL IMPLEMENTS CONNECTED TO LIFTING HITCHES AND RELATED CONTROL SYSTEMS AND METHODS

(71) Applicant: AGCO Corporation, Duluth, GA (US)

(72) Inventors: Benjamin Anson Fanshier, Hesston, KS (US); Monte J. Rans, Hesston, KS (US); Ross Duerksen, Hesston, KS (US); Zane Wesley Unrau, Wichita, KS (US); Robert L. Figger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 561 days.

(21) Appl. No.: 17/177,424

(22) Filed: Feb. 17, 2021

(65) Prior Publication Data

US 2021/0315147 A1    Oct. 14, 2021

Related U.S. Application Data

(60) Provisional application No. 63/007,130, filed on Apr. 8, 2020.

(51) Int. Cl.
*A01B 63/00* (2006.01)
*A01B 59/06* (2006.01)
(Continued)

(52) U.S. Cl.
CPC .......... *A01B 63/008* (2013.01); *A01B 59/066* (2013.01); *A01B 63/118* (2013.01);
(Continued)

(58) Field of Classification Search
CPC ... A01B 63/008; A01B 63/118; A01B 59/066; A01B 79/02; B60D 1/02; B60D 1/246; B60D 1/46; G05D 3/12; A01C 7/08
See application file for complete search history.

(56) References Cited

U.S. PATENT DOCUMENTS

| 4,173,259 A | 11/1979 | Heckenkamp |
| 9,078,391 B2 | 7/2015 | Pichlmaier |

(Continued)

FOREIGN PATENT DOCUMENTS

| DE | 3208246 A1 | 9/1983 | |
| DE | 102016225773 A1 * | 6/2018 | ............ A01B 63/10 |

(Continued)

OTHER PUBLICATIONS

Kuemmel, DE 102016225773 A1, machine translation of the entire document. (Year: 2018).*

(Continued)

*Primary Examiner* — Tara Mayo (57) ABSTRACT

A system includes a tractor comprising a lifting hitch, and an implement comprising an implement frame carried by the lifting hitch. The implement frame has an integrated elongate toolbar carrying at least one row unit. A sensor is configured to sense a position of the at least one row unit relative to the ground. A control system is configured to receive a signal related to the sensed position of the at least one row unit relative to the ground and cause the lifting hitch to raise or lower a portion of the implement frame connected to the lifting hitch relative to the tractor based at least in part on the signal. Control systems and related methods are also disclosed.

13 Claims, 4 Drawing Sheets

(51) Int. Cl.
*A01B 63/118* (2006.01)
*A01B 79/02* (2006.01)
*A01C 7/08* (2006.01)
*B60D 1/02* (2006.01)
*B60D 1/24* (2006.01)
*B60D 1/46* (2006.01)
*G05D 3/12* (2006.01)

(52) U.S. Cl.
CPC ............... *A01B 79/02* (2013.01); *B60D 1/02* (2013.01); *B60D 1/246* (2013.01); *B60D 1/46* (2013.01); *G05D 3/12* (2013.01); *A01C 7/08* (2013.01)

(56) References Cited

U.S. PATENT DOCUMENTS

| | | | |
|---|---|---|---|
| 9,086,699 | B2 | 7/2015 | Pirotais |
| 9,706,696 | B2 | 7/2017 | Gschwendtner |
| 2002/0084085 | A1* | 7/2002 | Pellenc et al. ..... B62D 49/0607 172/762 |
| 2005/0103244 | A1* | 5/2005 | Mayerle et al. ......... A01C 7/06 111/175 |
| 2008/0257570 | A1* | 10/2008 | Keplinger et al. ... A01B 63/145 172/7 |
| 2008/0264656 | A1* | 10/2008 | Kapfer ................. A01B 59/004 172/663 |
| 2018/0153089 | A1* | 6/2018 | Sporrer et al. ......... A01B 63/32 |
| 2019/0021211 | A1 | 1/2019 | Gutknecht |
| 2020/0221628 | A1* | 7/2020 | Blunier et al. ......... A01B 63/14 |
| 2020/0404837 | A1* | 12/2020 | Thompson et al. ... A01C 7/205 |

FOREIGN PATENT DOCUMENTS

| | | |
|---|---|---|
| EP | 0241748 A2 | 10/1987 |
| JP | H07147809 A | 6/1995 |
| JP | 2016096743 A | 5/2016 |
| JP | 2020156392 A | 10/2020 |

OTHER PUBLICATIONS

UK Intellectual Property Office, Search Report for related UK Application No. 2006680.9, dated Oct. 28, 2020.

* cited by examiner

SYSTEMS COMPRISING AGRICULTURAL IMPLEMENTS CONNECTED TO LIFTING HITCHES AND RELATED CONTROL SYSTEMS AND METHODS

CROSS-REFERENCE TO RELATED APPLICATION

This application claims the benefit of the filing date of U.S. Provisional Patent Application 63/007,130, "Systems Comprising Agricultural Implements Connected to Lifting Hitches and Related Control Systems and Methods," filed Apr. 8, 2020, the entire disclosure of which is incorporated herein by reference.

FIELD

Embodiments of the present disclosure relate generally to machines and methods for working agricultural fields. In particular, embodiments relate to implements (e.g., planters, tillage, etc.) and to methods of controlling such implements.

BACKGROUND

Crop yields are affected by a variety of factors, such as seed placement, soil quality, weather, irrigation, and nutrient applications. Seeds are typically planted in trenches formed by discs or other mechanisms of a planter row unit. Depth of seed placement is important because seeds planted at different depths emerge at different times, resulting in uneven crop growth. Trench depth can be affected by soil type, moisture level, row unit speed, and operation of the opening discs. It would be beneficial to have improved methods of controlling the location of planter row units so that seeds can be more precisely placed in a field.

BRIEF SUMMARY

In some embodiments, a system includes a tractor comprising a lifting hitch, and an implement comprising an implement frame carried by the lifting hitch. The implement frame has an integrated elongate toolbar carrying at least one row unit. A sensor is configured to sense a position of the at least one row unit relative to the ground. A control system is configured to receive a signal related to the sensed position of the at least one row unit relative to the ground and cause the lifting hitch to raise or lower a portion of the implement frame connected to the lifting hitch relative to the tractor based at least in part on the signal.

Other embodiments include a control system for a tractor having a lifting hitch and an implement having a frame carried by the lifting hitch. The frame has an integrated elongate toolbar carrying at least one row unit. The control system includes a sensor configured to sense a position of the at least one row unit relative to the ground, and a controller configured to receive a signal from the sensor indicating the position of the at least one row unit relative to the ground and raise or lower the lifting hitch based on the sensed position of the at least one row unit.

Certain embodiments include a computer-implemented method for operating a tractor having a lifting hitch and an implement having a frame carried by the lifting hitch, the frame having an integrated elongate toolbar carrying at least one row unit. The method includes receiving an indication of a position of the at least one row unit relative to the ground sensed by a sensor, and causing the lifting hitch to raise or lower the implement frame relative to the tractor based at least in part on the indication of the position of the at least one row unit.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

The illustrations presented herein are not actual views of any tillage implement or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

Figure 1:
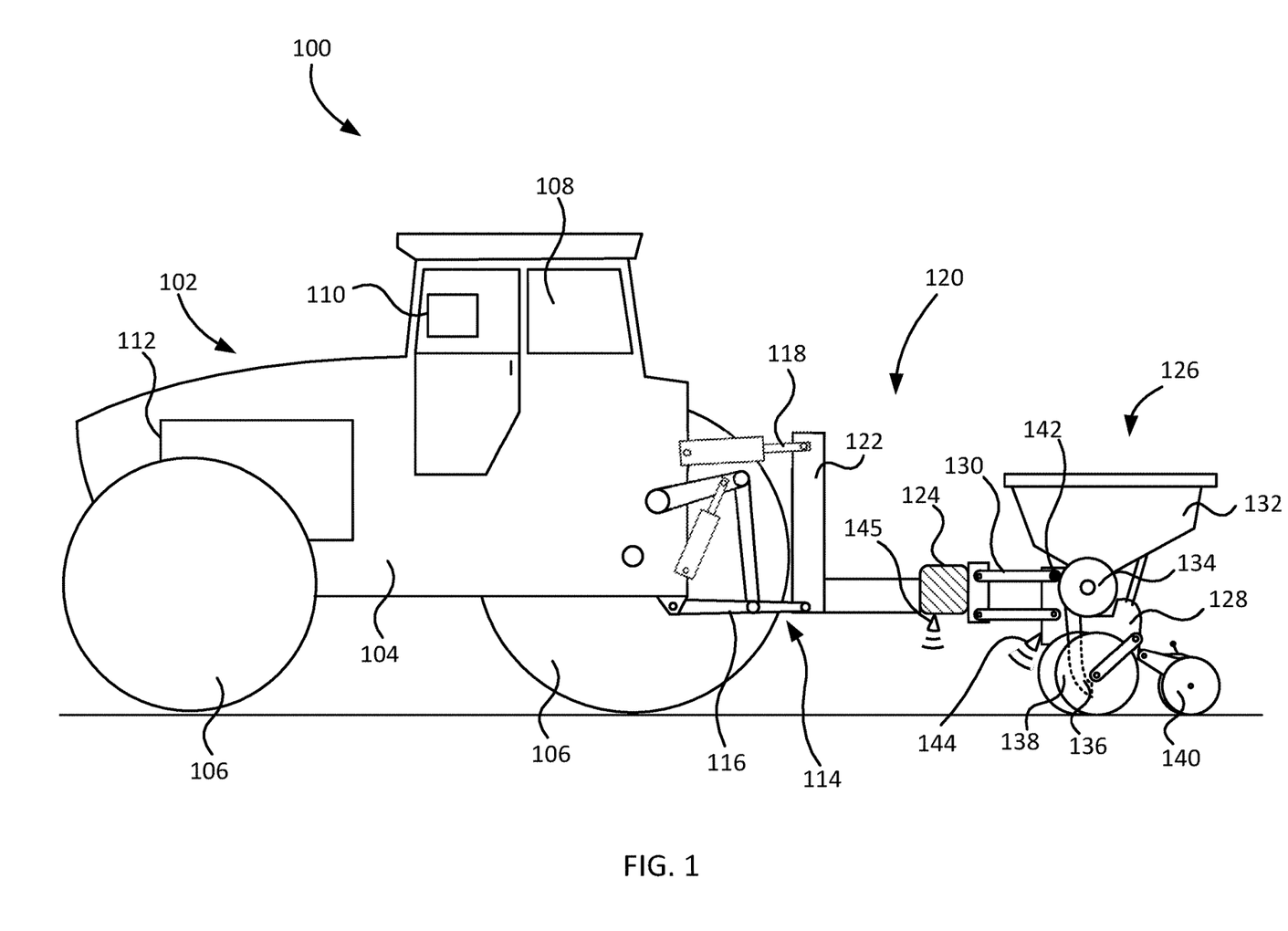
FIG. 1 is a simplified side view of a tractor pulling an implement in accordance with one embodiment.

FIG. 1 is a simplified side view of a system 100 including a tractor 102 and an implement 120. The tractor 102 includes a chassis 104 supported by wheels 106 and/or tracks. An operator cab 108 is typically supported by the chassis 104 and includes a control system 110 that may control operation of the tractor 102 and/or the implement 120. In some embodiments, the operator cab 108 may be omitted if the tractor 102 is configured to function without an onboard human operator (e.g., as a remotely operated drone or a computer-operated machine). The control system 110 may include a central processing unit ("CPU"), memory, and graphical user interface ("GUI") (e.g., a touch-screen interface). A global positioning system ("GPS") receiver may be mounted to the tractor 102 and connected to communicate with the control system 110. The tractor 102 has a power source 112 configured to move the wheels 106, which may include an internal combustion engine, an electric motor, or other source. The power source 112 may also provide power to a lifting hitch 114 carried by the tractor 102. Note that one of the rear wheels 106 has been omitted from view to more clearly show the lifting hitch 114. The lifting hitch 114 may be a 3-point hitch commonly carried by agricultural and other tractors.

The lifting hitch 114 may be attached to the chassis 104 and include two lower lifting arms 116 to which the implement 120 may be attached. An additional top link 118 (depicted in FIG. 1 as a piston-type actuator) may connect the implement 120 to the tractor 102.

As shown in FIG. 1, the implement 120 has a frame 122 including an integrated toolbar 124 supporting row units 126. That is, the frame 122 and the toolbar 124 may form a rigid structure. The row units 126 may be any type of ground-engaging device for planting, seeding, fertilizing, tilling, or otherwise working crops or soil, typically in rows. As an example, the row unit 126 is shown in the form of a planter row unit. The row unit 126 has a body 128 pivotally connected to the toolbar 124 by a parallel linkage 130, enabling the row unit 126 to move vertically independent of the toolbar 124. In some embodiments, the body 128 of the row unit 126 may be connected to the toolbar 124 by another structure, such as a rotating arm. The body 128 may be a unitary member, or may include one or more members coupled together (e.g., by bolts, welds, etc.). The body 128 operably supports one or more hoppers 132, a seed meter 134, a seed delivery mechanism 136, a seed trench opening assembly 138, a trench closing assembly 140, and any other components as known in the art. It should be understood that the row unit 126 shown in FIG. 1 may optionally be a part of a central fill planter, in which case the hoppers 132 may be one or more mini-hoppers fed by a central hopper carried by the implement 120.

At least one sensor 142 and/or 144 may be used to determine a position of a row unit 126 relative to the ground. In some embodiments, the sensor(s) 142, 144 may be carried on the body 128 of the row unit 126 itself. In other embodiments, sensor(s) may be carried by the toolbar 124, the tractor 102, or even by another vehicle (e.g., another ground vehicle, an unmanned aerial vehicle, etc.). The sensor 142 may be a rotary sensor configured to measure an angle of an element of the parallel linkage 130 relative to the body 128 of the row unit 126 or to the toolbar 124, and may be connected to a pivot point of the body 128 of the row unit 126 or to the toolbar 124. In some embodiments, an additional sensor 145 may be configured to detect the position of the toolbar 104 relative to the ground.

The sensor(s) 144, 145 depicted may include a non-contact depth sensor, for example, an optical sensor, an ultrasonic transducer, an RF (radio frequency) sensor, lidar, radar, etc. Such sensors are described in, for example, U.S. Patent Application Publication 2019/0075710, "Seed Trench Depth Detection Systems," published Mar. 14, 2019.

The sensor(s) 142, 144, 145 may provide information to the control system 110, which information can be used by the control system 110 to determine how to adjust the lifting hitch 114. That is, the control system 110 is configured to receive a signal (e.g., a wired or wireless signal) related to the position of the row unit 126 relative to the ground and cause the lifting hitch 114 to raise or lower a portion of the frame 122 connected to the lifting hitch 114 relative to the tractor 102 based at least in part on the signal.

Movement of the lifting hitch 114 changes the position of the frame 122 and the toolbar 124 relative to the ground. The top link 118 may be used to change an angle of the frame 122 and the toolbar 124, and to control an orientation and position of the implement 120 relative to the tractor 102. Thus, the lifting hitch 114 may be used to raise or lower the toolbar 124 and independently change an angle of the toolbar 124 relative to the ground. The lifting hitch 114 may be configured such that upward movement of the lifting hitch 114 can cause upward movement of an entirety of the implement frame 122. Movement of the top link 118 separate from the lifting arms 116 may cause a change in the orientation of the frame 122.

Figure 2:
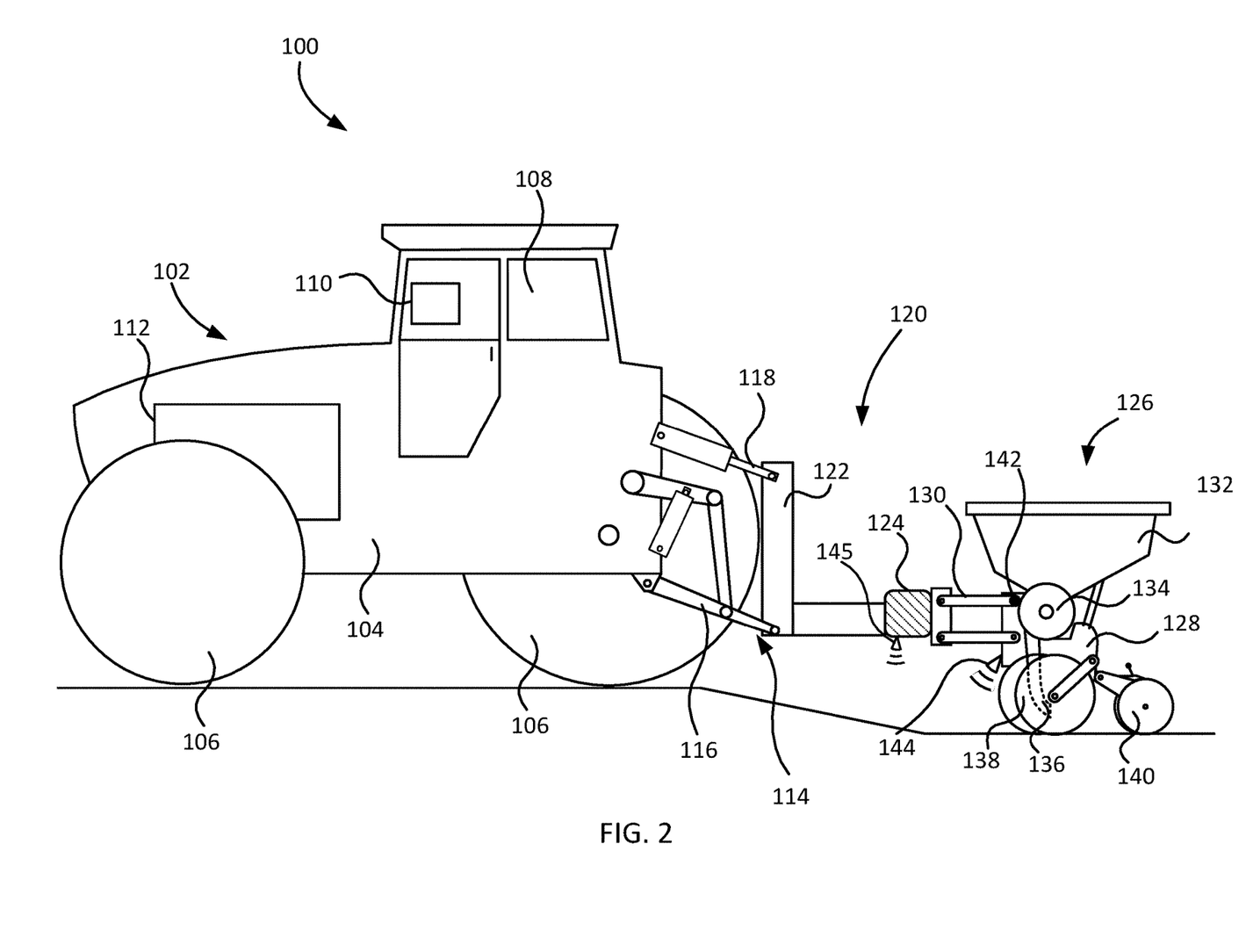
FIG. 2 is a simplified side view of the tractor pulling the implement shown in FIG. 1, wherein the tractor is at a higher elevation than the implement.

As depicted in FIG. 2, when the tractor 102 encounters a change in field elevation and/or slope, the sensor(s) 142, 144, 145 may provide a signal to the control system 110, and the control system 110 may use that signal to calculate how to change the position of the implement frame 122 to maintain a preselected position of the toolbar 124 and/or the row unit 126. For example, the lifting hitch 114 may lower the implement frame 122 as the tractor 102 goes up a slope, and after the row unit 126 goes up the slope, the lifting hitch 114 may raise the implement frame 122 back to its prior position. The parallel linkages 130 of each row unit 126 may also adjust to move the row units 126 independent of one another. As depicted in FIG. 2, movement of the lifting hitch 114 may be performed while maintaining a preselected orientation of the toolbar 124 by moving both the lifting arms 116 and the top link 118.

The implement 120 may not have any tires coupled to the toolbar 124 for supporting the weight of the implement 120. Thus, the weight of the implement 120 may be supported by the lifting hitch 114. In some embodiments, the row units 126 may include wheels in contact with the ground, such as in the seed trench opening assembly 138 or the trench closing assembly 140. Such wheels may support a portion of the weight of the implement 120. However, the implement 120 depicted lacks wheels or other ground support other than the row units 126.

The height of each row unit 126 may be adjusted independently of the other row units 126 by adjusting the individual parallel linkages 130. In certain field terrain, each parallel linkage 130 may be adjusted within its operating range such that each row unit 126 interacts with the ground at a preselected position. Movement of the toolbar 124 based on the lifting hitch 114 can increase the effective range of height of the row units 126 relative to the tractor 102. Thus, the implement 120 in combination with the tractor 102 as described may effectively be used to work fields having contours that are steeper than contours that can be effectively worked by conventional implements.

Figure 3:
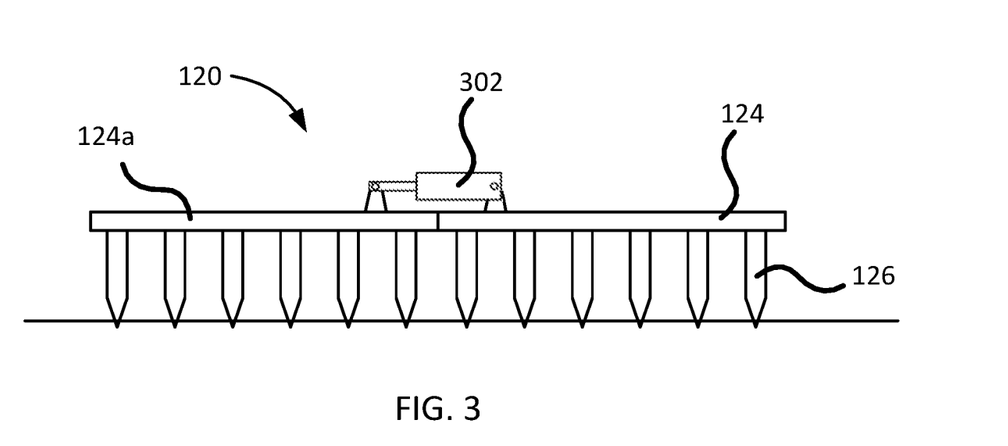
FIG. 3 is a simplified rear view the implement shown in FIG. 1 on level ground.

FIG. 3 shows a simplified rear view of the implement 120 traveling over level ground. The lifting hitch 114 (FIG. 1) is adjusted such that the row units 126 may each engage the ground by appropriate adjustment of the parallel linkages 130. The parallel linkages 130 may adjust the depth at which individual row units 126 operate (e.g., plant seeds) in the ground.

Figure 4:
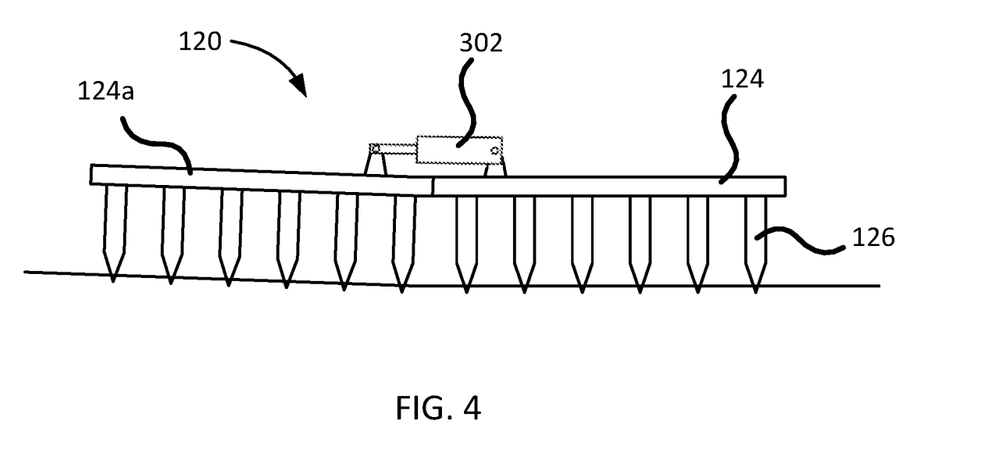
FIG. 4 is a simplified rear view the implement shown in FIG. 1 on sloped ground.

FIG. 4 shows a simplified rear view of the implement 120 traveling over sloped ground, and illustrates how the implement 120 may adjust to different terrain. In FIG. 4, the ground at the left-hand side is sloped upward from the center, and the ground at the right-hand side is level. The toolbar 124 may be coupled to one or more adjustable wing sections 124*a* that can flex (i.e., move relative to the toolbar 124) to match different terrain, such as described in U.S. Pat. No. 10,582,654, "Implement Load Balancing System," issued Mar. 10, 2020. One or more actuators 302 may raise or lower the wing section 124*a* such that the row units 126 carried by that wing section 124*a* remain at a preselected position with respect to the ground. That is, in addition to the parallel linkage 130, which is adjustable on a per-row-unit basis, the actuator 302 and the lifting hitch 114 may adjust the height and/or angle of the toolbar 124 or wing section(s) 124*a*, based at least in part on the sensed positions of the row units 126. Adjustment of the actuator 302 provides an additional range of adjustment beyond that provided by the parallel linkages 130 and the lifting hitch 114. That is, the row units 126 may be adjusted by moving the toolbar 124 upward or downward (i.e., by moving the lifting hitch 114), by moving the actuator 302, and by moving the row units 126 with respect to the toolbar 124 (i.e., by rotating the parallel linkage 130). Thus, each row unit 126 may exhibit a wider total range of motion than an implement 120 having only the parallel linkage 130 to adjust the height of the row unit 126 with respect to the tractor 102.

Typically, there may be multiple row units 126 on each of the toolbar 124 and the wing section(s) 124*a*. Thus, movement of the actuator 302 typically changes the position of the multiple row units 126. The control system 110 may calculate an appropriate position of the actuator 302, the lifting hitch 114, and the parallel linkages 130 so that the row units 126 on the toolbar 124 and the wing section(s) 124*a* can each be at a preselected depth. That is, the control system 110 may select an actuator position and a hitch position such that the row units 126 can each be adjusted with the parallel linkages 130 to be at a preselected depth. The actuator 302 may enable a wider range of operating conditions (e.g., maximum field slope variation) than conventional wing control systems and may enable the control system 110 to respond more quickly to changing field terrain.

Though the implement 120 is described herein as a planter, other types of implements may have other types of row units, such as tillage implements (e.g., disc harrows, chisel plows, field cultivators, etc.) and seeding tools (e.g., grain drills, disc drills, etc.).

Figure 5:
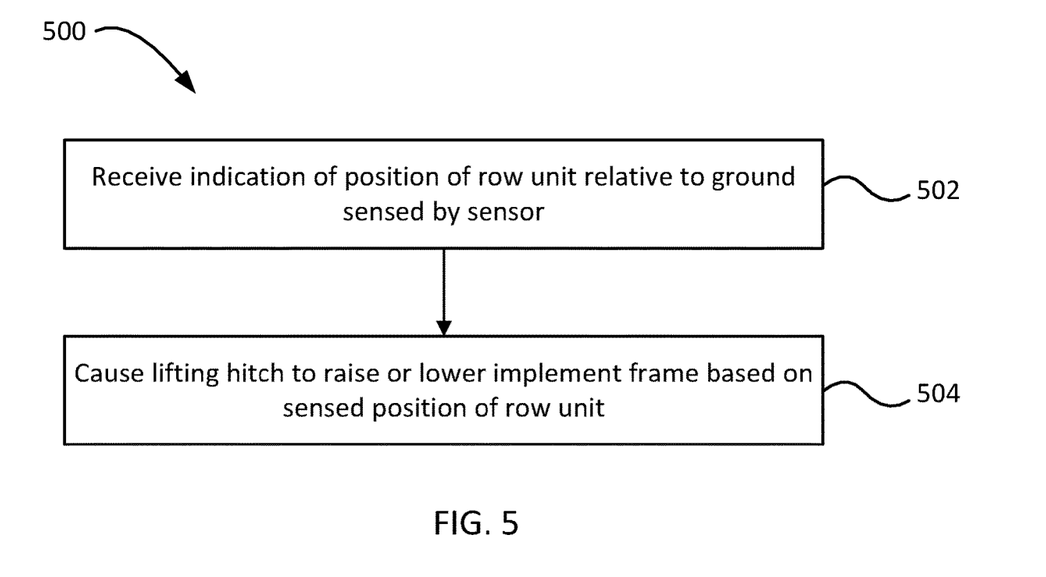
FIG. 5 is a simplified flow chart illustrating a method of operating a tractor and implement.

FIG. 5 is a simplified flow chart illustrating a computer-implemented method 500 of using the implement 120 to work an agricultural field. In block 502, an indication is received of a position of at least one row unit relative to ground sensed by a sensor. For example, a signal from the sensor may be received by a controller. In block 504, a lifting hitch raises or lowers an implement frame based at least in part on a sensed position of the at least one row unit. For example, a signal may be sent to a control component associated with the tractor 102. In some embodiments, the orientation of the toolbar may be maintained when the implement frame is raised or lowered.

Figure 6:
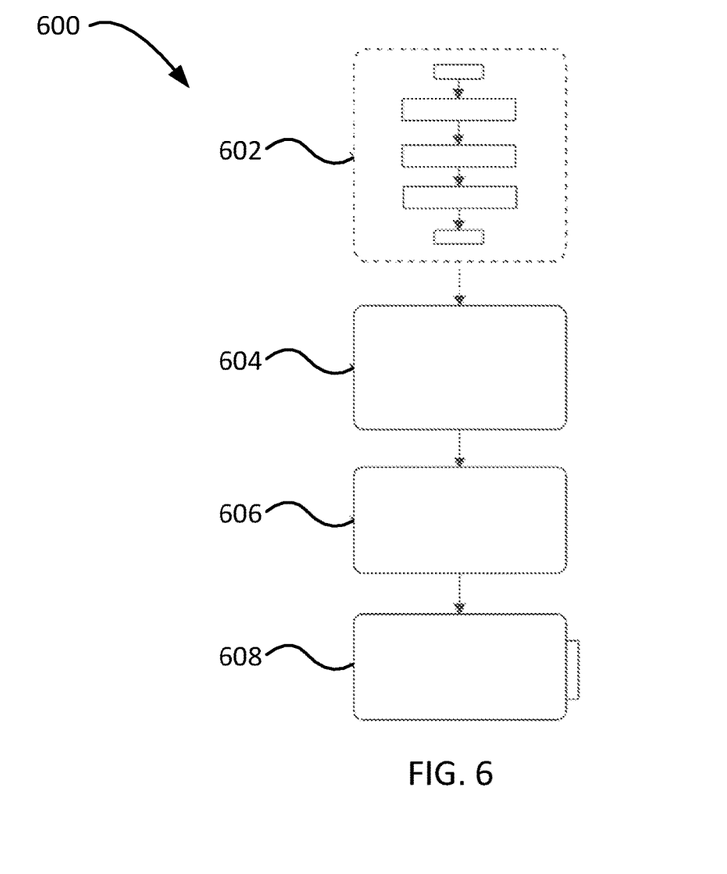
FIG. 6 illustrates an example computer-readable storage medium comprising processor-executable instructions configured to embody one or more of the methods of operating a tractor and implement, such as the method illustrated in FIG. 5.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 6, wherein an implementation 600 includes a computer-readable storage medium 602 (e.g., a flash drive, CD-R, DVD-R, application-specific integrated circuit (ASIC), field-programmable gate array (FPGA), a platter of a hard disk drive, etc.), on which is computer-readable data 604. This computer-readable data 604 in turn includes a set of processor-executable instructions 606 configured to operate according to one or more of the principles set forth herein. In some embodiments, the processor-executable instructions 606 may be configured to cause a computer associated with the tractor 102 (FIG. 1) to perform operations 608 when executed via a processing unit, such as at least some of the example method 500 depicted in FIG. 5. In other embodiments, the processor-executable instructions 606 may be configured to control a system, such as at least some of the example system 100 depicted in FIG. 1. Many such computer-readable media may be devised by those of ordinary skill in the art that are configured to operate in accordance with one or more of the techniques presented herein.

Additional non limiting example embodiments of the disclosure are described below.

Embodiment 1: A system comprising a tractor comprising a lifting hitch, an implement comprising an implement frame carried by the lifting hitch, the implement frame having an integrated elongate toolbar carrying at least one row unit, a sensor configured to sense a position of the at least one row unit relative to ground, and a control system configured to receive a signal related to the sensed position of the at least one row unit relative to the ground and cause the lifting hitch to raise or lower at least a portion of the implement frame connected to the lifting hitch relative to the tractor based at least in part on the signal.

Embodiment 2: The system of Embodiment 1, wherein the lifting hitch comprises a 3-point hitch.

Embodiment 3: The system of Embodiment 2, wherein the lifting hitch is configured to control an orientation and position of the implement frame relative to the tractor.

Embodiment 4: The system of Embodiment 2 or Embodiment 3, wherein the lifting hitch is configured such that upward movement of the lifting hitch causes upward movement of an entirety of the implement frame.

Embodiment 5: The system of any one of Embodiment 1 through Embodiment 4, wherein the at least one row unit is coupled to the toolbar by a parallel linkage.

Embodiment 6: The system of Embodiment 5, wherein the sensor comprises a rotary sensor configured to measure an angle of an element of the parallel linkage.

Embodiment 7: The system of any one of Embodiment 1 through Embodiment 6, wherein the sensor comprises an ultrasonic, lidar, or radar sensor.

Embodiment 8: The system of any one of Embodiment 1 through Embodiment 7, further comprising at least one adjustable wing section rotatably coupled to the toolbar.

Embodiment 9: The system of Embodiment 8, further comprising an actuator configured to raise or lower the at least one wing section of the toolbar.

Embodiment 10: The system of Embodiment 9, wherein the control system is configured to control the actuator based at least in part on the sensed position of the at least one row unit.

Embodiment 11: The system of any one of Embodiment 1 through Embodiment 10, wherein a weight of the implement frame is supported by the lifting hitch.

Embodiment 12: The system of any one of Embodiment 1 through Embodiment 11, wherein the implement frame is not supported by tires connected to the implement frame.

Embodiment 13: A control system for a tractor having a lifting hitch and an implement having a frame carried by the lifting hitch, the frame having an integrated elongate toolbar carrying at least one row unit. The control system comprises a sensor configured to sense a position of the at least one row unit relative to ground, and a controller configured to receive a signal from the sensor indicating the position of the at least one row unit relative to the ground and raise or lower the lifting hitch based on the sensed position of the at least one row unit.

Embodiment 14: A computer-implemented method for operating a tractor having a lifting hitch and an implement having a frame carried by the lifting hitch, the frame having an integrated elongate toolbar carrying at least one row unit. The method comprises receiving an indication of a position of the at least one row unit relative to ground sensed by a sensor, and causing the lifting hitch to raise or lower the implement frame relative to the tractor based at least in part on the indication of the position of the at least one row unit.

Embodiment 15: The method of Embodiment 14, wherein receiving an indication of a position of the at least one row unit relative to ground sensed by a sensor comprises receiving a signal from the sensor.

Embodiment 16: The method of Embodiment 14 or Embodiment 15, wherein causing the lifting hitch to raise or lower the implement frame relative to the tractor comprises maintaining a preselected orientation of the toolbar.

The structures and methods shown and described herein may be used in conjunction with those shown in U.S. Provisional Patent Application 60/007,114, "Agricultural Implements Having Row Unit Position Sensors and at Least One Adjustable Wheel, and Related Control Systems and Methods," filed Apr. 8, 2020; U.S. Provisional Patent Application 63/007,152, "Agricultural Implements Having Row Unit Position Sensors and a Rotatable Implement Frame, and Related Control Systems and Methods," filed Apr. 8, 2020; and U.S. Provisional Patent Application 63/007,182, "Agricultural Implements Having Row Unit Position Sensors and Actuators Configured to Rotate Toolbars, and Related Control Systems and Methods," filed Apr. 8, 2020. All references cited herein are incorporated herein in their entireties. If there is a conflict between definitions herein and in an incorporated reference, the definition herein shall control.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various agricultural machine types and configurations.

What is claimed is:

1. A system, comprising:
   a tractor comprising a lifting hitch;
   an implement comprising an implement frame carried by the lifting hitch, the implement frame having an integrated elongate toolbar carrying a plurality of planter row units, wherein the implement frame is not supported by tires connected to the implement frame;
   a sensor configured to sense a position of at least one planter row unit relative to ground; and
   a control system configured to receive a signal related to the sensed position of the at least one planter row unit relative to the ground and cause the lifting hitch to raise or lower at least a portion of the implement frame connected to the lifting hitch relative to the tractor based at least in part on the signal.

2. The system of claim 1, wherein the lifting hitch comprises a 3-point hitch.

3. The system of claim 2, wherein the lifting hitch is configured to control an orientation and position of the implement frame relative to the tractor.

4. The system of claim 2, wherein the lifting hitch is configured such that upward movement of the lifting hitch causes upward movement of an entirety of the implement frame.

5. The system of claim 1, wherein each planter row unit of the plurality is coupled to the toolbar by a parallel linkage.

6. The system of claim 5, wherein the sensor comprises a rotary sensor configured to measure an angle of an element of the parallel linkage.

7. The system of claim 1, wherein the sensor comprises an ultrasonic, lidar, or radar sensor.

8. The system of claim 1, further comprising at least one adjustable wing section rotatably coupled to the toolbar.

9. The system of claim 8, further comprising an actuator configured to raise or lower the at least one wing section relative to the toolbar.

10. The system of claim 9, wherein the control system is configured to control the actuator based at least in part on the sensed position of the at least one planter row unit.

11. The system of claim 1, wherein a weight of the implement frame is supported by the lifting hitch.

12. The system of claim 1, wherein each planter row unit comprises a seed meter.

13. The system of claim 1, wherein each planter row unit comprises at least one wheel configured to be in contact with the ground.

* * * * *